(12) United States Patent
Yap

(10) Patent No.: US 10,044,710 B2
(45) Date of Patent: Aug. 7, 2018

(54) DEVICE AND METHOD FOR VALIDATING A USER USING AN INTELLIGENT VOICE PRINT

(71) Applicant: Kurt Ransom Yap, Rancho Santa Margarita, CA (US)

(72) Inventor: Kurt Ransom Yap, Rancho Santa Margarita, CA (US)

(73) Assignee: BPIP LIMITED LIABILITY COMPANY, Buffalo, NY (US)

( * ) Notice: Subject to any disclaimer, the term of this patent is extended or adjusted under 35 U.S.C. 154(b) by 209 days.

(21) Appl. No.: 15/075,516

(22) Filed: Mar. 21, 2016

(65) Prior Publication Data

US 2017/0244700 A1  Aug. 24, 2017

Related U.S. Application Data

(60) Provisional application No. 62/298,041, filed on Feb. 22, 2016.

(51) Int. Cl.

| | | |
|---|---|---|
| G06F 7/04 | (2006.01) | |
| G06F 17/30 | (2006.01) | |
| H04L 29/06 | (2006.01) | |
| G06Q 20/10 | (2012.01) | |
| G06Q 20/40 | (2012.01) | |

(52) U.S. Cl.
CPC ....... *H04L 63/0861* (2013.01); *G06Q 20/108* (2013.01); *G06Q 20/40145* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 6,556,127 B1 * | 4/2003 | Moser | G07C 9/00158 340/5.22 |
| 7,512,567 B2 | 3/2009 | Bemmel et al. | |
| 7,599,522 B2 | 10/2009 | Ito | |
| 7,630,524 B2 | 12/2009 | Lauper et al. | |
| 7,769,209 B2 | 8/2010 | Komura et al. | |
| 8,068,011 B1 | 11/2011 | Sajadi et al. | |
| 8,150,772 B2 | 4/2012 | Mardikar et al. | |
| 8,332,272 B2 | 12/2012 | Fisher | |
| 8,352,323 B2 | 1/2013 | Fisher | |
| 8,396,799 B2 | 3/2013 | Hurry | |
| 8,443,200 B2 | 5/2013 | Karthik | |
| 8,447,272 B2 | 5/2013 | Faith et al. | |
| 8,505,826 B2 | 8/2013 | Hachey | |
| 8,543,831 B2 | 9/2013 | Bilger et al. | |

(Continued)

*Primary Examiner* — Kenny S Lin

(57) ABSTRACT

A method of validating a user for accessing a secure system comprising selecting a picture that is prompted to the user, generating, through the user, an intelligent voice print in regards to the selected picture, matching the intelligent voice print associated with the selected picture to a stored authentication voice print and picture pair, authenticating the user when the intelligent voice print is matched to within a predetermined voice tolerance, verifying a textual component of the intelligent voice print to within a predetermined textual tolerance, validating the authenticating and the verifying of the user, and receiving access to the secure system based on the validating of the user against the stored intelligent voice print and picture pair.

20 Claims, 3 Drawing Sheets

(56) References Cited

U.S. PATENT DOCUMENTS

| | | |
|---|---|---|
| 8,554,685 B2 | 10/2013 | Patterson et al. |
| 8,555,066 B2 | 10/2013 | Headley |
| 8,571,188 B2 | 10/2013 | Gantman et al. |
| 8,572,707 B2 | 10/2013 | Tuchman et al. |
| 8,589,237 B2 | 11/2013 | Fisher |
| 8,606,720 B1 | 12/2013 | Baker et al. |
| 8,620,823 B2 | 12/2013 | Hurry |
| 8,639,577 B1 | 1/2014 | Argue et al. |
| 8,645,213 B2 | 2/2014 | Granbery et al. |
| 8,655,310 B1 | 2/2014 | Katzer et al. |
| 8,662,389 B2 | 3/2014 | Dorsey et al. |
| 8,666,895 B2 | 3/2014 | Grigg et al. |
| 8,682,798 B2 | 3/2014 | Patterson |
| 8,688,526 B2 | 4/2014 | Fisher |
| 8,694,793 B2 | 4/2014 | Evans |
| 8,712,874 B2 | 4/2014 | Keld |
| 8,717,393 B2 | 5/2014 | Pasquero et al. |
| 8,732,813 B2 | 5/2014 | Coppinger |
| 8,738,475 B2 | 5/2014 | Keld |
| 8,744,914 B2 | 6/2014 | Mon et al. |
| 8,751,315 B2 | 6/2014 | Fisher |
| 8,751,316 B1 | 6/2014 | Fletchall et al. |
| 8,768,836 B1 | 7/2014 | Acharya |
| 8,781,903 B1 | 7/2014 | Bohen et al. |
| 8,781,957 B2 | 7/2014 | Jackson et al. |
| 8,788,314 B2 | 7/2014 | Procopiuc et al. |
| 8,788,348 B2 | 7/2014 | Joynes et al. |
| 8,788,349 B2 | 7/2014 | Albisu |
| 8,793,187 B2 | 7/2014 | Alvarez et al. |
| 8,799,087 B2 | 8/2014 | Martin et al. |
| 8,800,865 B2 | 8/2014 | Vadhri |
| 8,805,326 B2 | 8/2014 | Marcus et al. |
| 8,805,726 B2 | 8/2014 | Fisher |
| 8,810,834 B2 | 8/2014 | Shozaki |
| 8,812,367 B2 | 8/2014 | Aziz et al. |
| 8,812,394 B1 | 8/2014 | Folk et al. |
| 8,818,867 B2 | 8/2014 | Baldwin et al. |
| 8,818,870 B2 | 8/2014 | Fisher |
| 8,818,874 B2 | 8/2014 | Veseli |
| 8,820,632 B1 | 9/2014 | West |
| 8,825,517 B2 | 9/2014 | Hammad et al. |
| 8,838,075 B2 | 9/2014 | Basir et al. |
| 8,840,018 B2 | 9/2014 | Gelman et al. |
| 8,847,607 B2 | 9/2014 | Rossi et al. |
| 8,849,845 B2 | 9/2014 | Pasquero et al. |
| 8,850,556 B2 * | 9/2014 | Freund ............... G06F 21/36 382/103 |
| 8,856,032 B2 | 10/2014 | Carlegren et al. |
| 8,861,016 B2 | 10/2014 | Kodama et al. |
| 8,875,139 B2 | 10/2014 | Hayduchok et al. |
| 8,876,172 B2 | 11/2014 | Denison et al. |
| 8,879,080 B2 | 11/2014 | Kogoshi |
| 8,880,434 B2 | 11/2014 | Bemmel et al. |
| 8,881,557 B2 | 11/2014 | McEachern |
| 8,881,561 B2 | 11/2014 | Niehausmeier |
| 8,881,563 B2 | 11/2014 | Fukatsu et al. |
| 8,882,149 B2 | 11/2014 | Tomaru et al. |
| 8,887,320 B2 | 11/2014 | DeZarn et al. |
| 8,887,541 B2 | 11/2014 | Zhang et al. |
| 8,887,907 B2 | 11/2014 | Will et al. |
| 8,888,430 B2 | 11/2014 | Groppo |
| 8,890,357 B2 | 11/2014 | Campbell |
| 8,890,689 B2 | 11/2014 | Ezzo et al. |
| 8,893,315 B2 | 11/2014 | Frey |
| 8,893,317 B2 | 11/2014 | Smith |
| 8,893,965 B2 | 11/2014 | Mun et al. |
| 8,898,088 B2 | 11/2014 | Springer et al. |
| 8,899,082 B2 | 12/2014 | Keller |
| 8,904,574 B2 | 12/2014 | Hashimoto et al. |
| 8,904,614 B2 | 12/2014 | Stafford |
| 8,904,838 B2 | 12/2014 | Havemann et al. |
| 8,905,308 B2 | 12/2014 | Orii |
| 8,909,547 B2 | 12/2014 | Bohen et al. |
| 8,909,771 B2 | 12/2014 | Heath |
| 8,910,499 B2 | 12/2014 | Franceschi |
| 8,910,765 B2 | 12/2014 | Min |
| 8,912,879 B2 | 12/2014 | Fyke et al. |
| 8,912,904 B2 | 12/2014 | Ho |
| 8,914,308 B2 | 12/2014 | Rosendahl et al. |
| 8,915,523 B2 | 12/2014 | Tillman |
| 8,918,921 B2 | 12/2014 | Mehta |
| 8,918,922 B2 | 12/2014 | Kido et al. |
| 8,918,923 B2 | 12/2014 | Song |
| 8,919,709 B2 | 12/2014 | Zhou et al. |
| 8,922,333 B1 | 12/2014 | Kirkjan |
| 8,924,257 B2 | 12/2014 | Fernando et al. |
| 8,924,259 B2 | 12/2014 | Neighman et al. |
| 8,924,299 B2 | 12/2014 | Huang et al. |
| 8,925,359 B2 | 1/2015 | Frankel |
| 8,925,361 B2 | 1/2015 | Granny et al. |
| 8,925,415 B2 | 1/2015 | Okada et al. |
| 8,925,416 B2 | 1/2015 | Okada et al. |
| 8,925,807 B2 | 1/2015 | Utley et al. |
| 8,925,874 B2 | 1/2015 | Crain |
| 8,930,233 B2 | 1/2015 | Johnson |
| 8,930,711 B2 | 1/2015 | Asnaashari et al. |
| 8,931,691 B2 | 1/2015 | Manessis et al. |
| 8,934,835 B2 | 1/2015 | DeLuca |
| 8,935,943 B2 | 1/2015 | Derman |
| 8,936,190 B2 | 1/2015 | Rothschild |
| 8,937,526 B2 | 1/2015 | Chandler, Jr. |
| 8,938,997 B2 | 1/2015 | Piccoli et al. |
| 8,939,360 B2 | 1/2015 | Grossman |
| 8,943,621 B2 | 2/2015 | Wang |
| 8,943,861 B2 | 2/2015 | Fong |
| 8,943,865 B1 | 2/2015 | Bullock et al. |
| 8,944,316 B2 | 2/2015 | Hoeschen |
| 8,944,336 B2 | 2/2015 | Adams et al. |
| 8,949,608 B2 | 2/2015 | Hoornaert et al. |
| 8,950,225 B2 | 2/2015 | Muller et al. |
| 8,950,426 B2 | 2/2015 | Yewdall et al. |
| 8,955,361 B2 | 2/2015 | Tanaka |
| 8,959,238 B2 | 2/2015 | Beyer et al. |
| 8,959,963 B2 | 2/2015 | Stoll |
| 8,959,964 B2 | 2/2015 | Hidaka et al. |
| 8,959,965 B2 | 2/2015 | Gray |
| 8,960,030 B2 | 2/2015 | Asakura |
| 8,966,060 B2 | 2/2015 | Miyazaki et al. |
| 8,966,610 B2 | 2/2015 | Coppinger |
| 8,966,674 B2 | 3/2015 | Lu et al. |
| 8,966,675 B1 | 3/2015 | Simeone |
| 8,966,945 B1 | 3/2015 | Buechel |
| 8,966,949 B2 | 3/2015 | Habecke |
| 8,967,168 B1 | 3/2015 | Gusanders |
| 8,967,183 B2 | 3/2015 | Oakner et al. |
| 8,967,471 B1 | 3/2015 | Rosenthal et al. |
| 8,967,480 B2 | 3/2015 | Itwaru |
| 8,973,812 B2 | 3/2015 | Mikolajczyk et al. |
| 8,973,823 B2 | 3/2015 | Dawber et al. |
| 8,976,943 B2 | 3/2015 | Tonini |
| 8,977,248 B1 | 3/2015 | Bladon et al. |
| 8,977,547 B2 | 3/2015 | Yamazaki et al. |
| 8,977,551 B2 | 3/2015 | Wu et al. |
| 8,978,121 B2 * | 3/2015 | Shuster ............... H04L 63/126 726/21 |
| 8,978,184 B1 | 3/2015 | Garrett |
| 8,978,427 B2 | 3/2015 | Ho et al. |
| 8,978,811 B2 | 3/2015 | Laval et al. |
| 8,978,976 B2 | 3/2015 | Seo et al. |
| 8,979,778 B2 | 3/2015 | Faredoun |
| 8,983,040 B2 | 3/2015 | Moncomble |
| 8,983,042 B1 | 3/2015 | Ho et al. |
| 8,983,835 B2 | 3/2015 | Wong et al. |
| 8,983,841 B2 | 3/2015 | Pulz et al. |
| 8,984,626 B2 | 3/2015 | Barton et al. |
| 8,985,442 B1 | 3/2015 | Zhou et al. |
| 8,985,648 B2 | 3/2015 | Muller et al. |
| 8,988,186 B1 | 3/2015 | Dent |
| 8,988,187 B2 | 3/2015 | Wong et al. |
| 8,988,248 B2 | 3/2015 | Beck et al. |
| 8,989,785 B2 | 3/2015 | Doulton |
| 8,991,224 B2 | 3/2015 | Zalvari |
| 8,991,225 B2 | 3/2015 | Wu et al. |
| 8,991,226 B2 | 3/2015 | Daniels |

(56) References Cited

U.S. PATENT DOCUMENTS

| | | |
|---|---|---|
| 8,991,227 B2 | 3/2015 | Muller et al. |
| 8,991,228 B2 | 3/2015 | Yang |
| 8,991,696 B1 | 3/2015 | Daniel |
| 8,992,450 B1 | 3/2015 | Heilman |
| 8,995,627 B1 | 3/2015 | van Rensburg et al. |
| 8,995,628 B2 | 3/2015 | Zirngibl et al. |
| 8,997,536 B2 | 4/2015 | Fuller et al. |
| 8,997,779 B2 | 4/2015 | Rohde |
| 9,002,333 B1 | 4/2015 | Tong et al. |
| 9,002,705 B2 | 4/2015 | Yoshida |
| 9,002,713 B2 | 4/2015 | Ljolje et al. |
| 9,002,719 B2 | 4/2015 | Tofte |
| 9,003,300 B2 | 4/2015 | Deluca et al. |
| 9,003,515 B2 | 4/2015 | Genem |
| 9,003,572 B2 | 4/2015 | Knorr et al. |
| 9,004,351 B2 | 4/2015 | Sandstrom et al. |
| 9,004,354 B1 | 4/2015 | Amacker et al. |
| 9,004,356 B2 | 4/2015 | McKelvey |
| 9,008,285 B2 | 4/2015 | Abel |
| 9,008,286 B2 | 4/2015 | Ni et al. |
| 9,009,042 B1 | 4/2015 | Quasthoff et al. |
| 9,009,877 B2 | 4/2015 | Miwa et al. |
| 9,010,161 B2 | 4/2015 | Oliana |
| 9,010,644 B1 | 4/2015 | Workley |
| 9,013,306 B2 | 4/2015 | Koh et al. |
| 9,014,347 B2 | 4/2015 | Moore et al. |
| 9,014,348 B2 | 4/2015 | Anderson |
| 9,014,349 B2 | 4/2015 | Grigoriev et al. |
| 9,014,350 B2 | 4/2015 | LaPine |
| 9,014,364 B1 | 4/2015 | Koster et al. |
| 9,015,063 B2 | 4/2015 | Fisher |
| 9,015,074 B2 | 4/2015 | Chen et al. |
| 9,015,099 B2 | 4/2015 | Nitz et al. |
| 9,015,492 B2 | 4/2015 | Aaron |
| 9,015,693 B2 | 4/2015 | Goller et al. |
| 9,016,565 B2 | 4/2015 | Zhou et al. |
| 9,016,566 B2 | 4/2015 | Tang et al. |
| 9,016,568 B2 | 4/2015 | Wakao et al. |
| 9,016,733 B2 | 4/2015 | Fath |
| 9,019,075 B2 | 4/2015 | Hayashida |
| 9,019,104 B2 | 4/2015 | Johnson et al. |
| 9,020,114 B2 | 4/2015 | Hogg |
| 9,020,117 B2 | 4/2015 | Caceres et al. |
| 9,020,816 B2 | 4/2015 | McClain |
| 9,022,285 B2 | 5/2015 | Graylin |
| 9,022,286 B2 | 5/2015 | Wyatt |
| 9,024,722 B2 | 5/2015 | Nichols et al. |
| 9,025,737 B2 | 5/2015 | Li et al. |
| 9,025,739 B2 | 5/2015 | Shaw |
| 9,025,740 B2 | 5/2015 | Eng et al. |
| 9,025,749 B1 | 5/2015 | Nguyen |
| 9,026,438 B2 | 5/2015 | Buck et al. |
| 9,026,440 B1 | 5/2015 | Konchitsky |
| 9,027,432 B2 | 5/2015 | Takano et al. |
| 9,027,839 B2 | 5/2015 | Sziljer et al. |
| 9,030,292 B2 | 5/2015 | Torgersrud et al. |
| 9,030,706 B2 | 5/2015 | Kodama et al. |
| 9,031,210 B2 | 5/2015 | Charugundla |
| 9,031,215 B2 | 5/2015 | Riley et al. |
| 9,031,221 B2 | 5/2015 | Kulkarni et al. |
| 9,031,536 B2 | 5/2015 | Fitzgerald et al. |
| 9,031,537 B2 | 5/2015 | Ortiz et al. |
| 9,031,611 B2 | 5/2015 | Fisher |
| 9,031,847 B2 | 5/2015 | Sarin et al. |
| 9,031,864 B2 | 5/2015 | Evans |
| 9,032,493 B2 | 5/2015 | Lortz et al. |
| 9,032,769 B2 | 5/2015 | Villagrasa et al. |
| 9,033,217 B2 | 5/2015 | Williams et al. |
| 9,036,621 B2 | 5/2015 | Qiu et al. |
| 9,036,792 B2 | 5/2015 | Cacioppo et al. |
| 9,036,794 B2 | 5/2015 | Mukhopadhyay et al. |
| 9,037,451 B2 | 5/2015 | Johnson et al. |
| 9,037,471 B2 | 5/2015 | Lee et al. |
| 9,037,489 B2 | 5/2015 | Jeong |
| 9,038,426 B2 | 5/2015 | Flynn |
| 9,038,894 B2 | 5/2015 | Khalid |
| 9,038,907 B1 | 5/2015 | Lebaschi et al. |
| 9,038,914 B2 | 5/2015 | Smets et al. |
| 9,041,536 B2 | 5/2015 | Guessford |
| 9,041,562 B2 | 5/2015 | Jain et al. |
| 9,042,111 B2 | 5/2015 | Urquhart et al. |
| 9,042,523 B2 | 5/2015 | Vasquez et al. |
| 9,042,525 B2 | 5/2015 | Harris et al. |
| 9,042,526 B2 | 5/2015 | Rose et al. |
| 9,042,527 B2 | 5/2015 | Shaw |
| 9,043,210 B1 | 5/2015 | Adcock et al. |
| 9,047,590 B2 | 6/2015 | Patterson et al. |
| 9,053,146 B1 | 6/2015 | Kapoor et al. |
| 9,053,474 B2 | 6/2015 | White |
| 9,064,373 B2 | 6/2015 | Alderucci |
| 9,065,913 B2 | 6/2015 | Sheikh et al. |
| 9,075,977 B2 | 7/2015 | Gross |
| 9,084,114 B2 | 7/2015 | Beilis et al. |
| 9,088,386 B2 | 7/2015 | Brisebois et al. |
| 9,100,825 B2 | 8/2015 | Schultz et al. |
| 9,111,411 B2 | 8/2015 | Alderucci |
| 9,111,546 B2 | 8/2015 | Mauro et al. |
| 9,113,206 B2 | 8/2015 | Ritter et al. |
| 9,118,669 B2 | 8/2015 | Moganti et al. |
| 9,118,671 B2 | 8/2015 | Novack et al. |
| 9,125,057 B2 | 9/2015 | Neal et al. |
| 9,125,987 B2 | 9/2015 | Levien et al. |
| 9,130,929 B2 | 9/2015 | Dorfman et al. |
| 9,141,951 B2 | 9/2015 | McNeal |
| 9,143,506 B2 | 9/2015 | Duncan |
| 9,148,517 B1 | 9/2015 | Webster et al. |
| 9,160,849 B1 | 10/2015 | Whitmore et al. |
| 9,160,866 B1 | 10/2015 | Keiser |
| 9,165,323 B1 | 10/2015 | Lapsley et al. |
| 9,178,974 B2 | 11/2015 | Ross et al. |
| 9,179,296 B2 | 11/2015 | Jabara et al. |
| 9,190,062 B2 | 11/2015 | Haughay |
| 9,202,212 B1 | 12/2015 | Candelore et al. |
| 9,215,321 B2 | 12/2015 | Timem et al. |
| 9,218,814 B2 | 12/2015 | Xiong |
| 9,219,708 B2 | 12/2015 | Anati et al. |
| 9,225,716 B2 | 12/2015 | Tuchman et al. |
| 9,236,052 B2 | 1/2016 | Timem et al. |
| 9,237,232 B1 | 1/2016 | Williams et al. |
| 9,247,054 B2 | 1/2016 | Sharma |
| 9,247,059 B1 | 1/2016 | Chidambaram |
| 9,251,514 B2 | 2/2016 | Duncan |
| 9,254,363 B2 | 2/2016 | Levien et al. |
| 9,262,612 B2 | 2/2016 | Cheyer |
| 9,270,825 B2 | 2/2016 | Deshmukh et al. |
| 9,270,832 B2 | 2/2016 | Brown et al. |
| 9,680,942 B2 * | 6/2017 | Dimmick ............... H04L 67/18 |
| 2002/0104027 A1 | 8/2002 | Skerpac |
| 2007/0005988 A1 | 1/2007 | Zhang et al. |
| 2007/0165799 A1 | 7/2007 | Juncker |
| 2008/0041942 A1 | 2/2008 | Aissa |
| 2009/0055193 A1 * | 2/2009 | Maislos ............... G06F 21/32 |
| | | 704/273 |
| 2009/0187405 A1 | 7/2009 | Bhogal et al. |
| 2009/0319270 A1 * | 12/2009 | Gross ..................... G10L 15/22 |
| | | 704/246 |
| 2011/0035284 A1 | 2/2011 | Moshfeghi |
| 2011/0047605 A1 | 2/2011 | Sontag et al. |
| 2011/0087611 A1 | 4/2011 | Chetal |
| 2011/0246196 A1 | 10/2011 | Bhaskaran |
| 2012/0245941 A1 | 9/2012 | Cheyer et al. |
| 2012/0316963 A1 | 12/2012 | Moshfeghi |
| 2013/0018657 A1 | 1/2013 | Di Mambro et al. |
| 2013/0167223 A1 | 6/2013 | Prerna et al. |
| 2013/0179195 A1 | 7/2013 | Lorsch |
| 2013/0183937 A1 | 7/2013 | Neal et al. |
| 2013/0191018 A1 | 7/2013 | Siereveld et al. |
| 2013/0191213 A1 | 7/2013 | Beck et al. |
| 2013/0191647 A1 | 7/2013 | Ferrara et al. |
| 2013/0203439 A1 | 8/2013 | Lifshitz |
| 2013/0218571 A1 | 8/2013 | Tamir et al. |
| 2013/0218697 A1 | 8/2013 | Kingston et al. |
| 2013/0237142 A1 | 9/2013 | Brisebois et al. |
| 2013/0246200 A1 | 9/2013 | Albisu |

(56) References Cited

U.S. PATENT DOCUMENTS

| | | |
|---|---|---|
| 2013/0260792 A1 | 10/2013 | Johnson, Jr. et al. |
| 2013/0262112 A1 | 10/2013 | Jaiswal et al. |
| 2013/0272511 A1 | 10/2013 | Bouzid et al. |
| 2013/0293368 A1 | 11/2013 | Ottah et al. |
| 2013/0295881 A1 | 11/2013 | Wohlert et al. |
| 2013/0305291 A1 | 11/2013 | Dua |
| 2013/0311180 A1 | 11/2013 | Amison |
| 2013/0311376 A1 | 11/2013 | Blair et al. |
| 2013/0321585 A1 | 12/2013 | Hassebrook et al. |
| 2013/0324188 A1 | 12/2013 | Jayapalan et al. |
| 2013/0344859 A1 | 12/2013 | Abramson et al. |
| 2014/0012920 A1 | 1/2014 | Aaron |
| 2014/0014720 A1 | 1/2014 | Sarkis et al. |
| 2014/0020084 A1 | 1/2014 | Gross |
| 2014/0026075 A1 | 1/2014 | Goller et al. |
| 2014/0045458 A1 | 2/2014 | Beilis et al. |
| 2014/0051381 A1 | 2/2014 | Ginter, Jr. et al. |
| 2014/0052480 A1 | 2/2014 | Bell et al. |
| 2014/0052680 A1 | 2/2014 | Nitz et al. |
| 2014/0052681 A1 | 2/2014 | Nitz et al. |
| 2014/0056418 A1 | 2/2014 | Sheikh et al. |
| 2014/0058950 A1 | 2/2014 | Gupta |
| 2014/0064469 A1 | 3/2014 | Brown et al. |
| 2014/0069999 A1 | 3/2014 | Sanford |
| 2014/0075530 A1 | 3/2014 | Novack et al. |
| 2014/0084059 A1 | 3/2014 | Sierchio et al. |
| 2014/0089098 A1 | 3/2014 | Roundtree |
| 2014/0096196 A1 | 4/2014 | O'Connor et al. |
| 2014/0097243 A1 | 4/2014 | Luo |
| 2014/0099923 A1 | 4/2014 | Kalderen |
| 2014/0101732 A1 | 4/2014 | Cincera |
| 2014/0108124 A1 | 4/2014 | Bous et al. |
| 2014/0119520 A1 | 5/2014 | Jaiswal et al. |
| 2014/0122331 A1 | 5/2014 | Vaish et al. |
| 2014/0128053 A1 | 5/2014 | Merchant |
| 2014/0136331 A1 | 5/2014 | Madhavapeddi et al. |
| 2014/0137199 A1 | 5/2014 | Hefetz |
| 2014/0138435 A1 | 5/2014 | Khalid |
| 2014/0138438 A1 | 5/2014 | Wakao et al. |
| 2014/0144982 A1 | 5/2014 | Anderson |
| 2014/0144983 A1 | 5/2014 | Dorsey et al. |
| 2014/0156531 A1 | 6/2014 | Poon et al. |
| 2014/0162595 A1 | 6/2014 | Raleigh et al. |
| 2014/0162598 A1 | 6/2014 | Villa-Real et al. |
| 2014/0164254 A1 | 6/2014 | Dimmick |
| 2014/0166747 A1 | 6/2014 | Wormsley et al. |
| 2014/0172715 A1 | 6/2014 | Gupta |
| 2014/0180850 A1 | 6/2014 | Ackley |
| 2014/0181898 A1 | 6/2014 | Apparao et al. |
| 2014/0183257 A1 | 7/2014 | Grossman |
| 2014/0189261 A1 | 7/2014 | Hildesheim et al. |
| 2014/0195278 A1 | 7/2014 | Denker et al. |
| 2014/0201770 A1 | 7/2014 | Schraga |
| 2014/0209672 A1 | 7/2014 | Mestre et al. |
| 2014/0209673 A1 | 7/2014 | Phillips |
| 2014/0209674 A1 | 7/2014 | Borucki et al. |
| 2014/0213220 A1 | 7/2014 | Huber et al. |
| 2014/0046842 A1 | 8/2014 | Irudayam et al. |
| 2014/0217171 A1 | 8/2014 | Greene |
| 2014/0222682 A1 | 8/2014 | Dua |
| 2014/0223283 A1 | 8/2014 | Hancock et al. |
| 2014/0224871 A1 | 8/2014 | Lai |
| 2014/0227962 A1 | 8/2014 | Brisebois et al. |
| 2014/0229380 A1 | 8/2014 | Duncan |
| 2014/0230032 A1 | 8/2014 | Duncan |
| 2014/0230033 A1 | 8/2014 | Ducan |
| 2014/0231511 A1 | 8/2014 | Kisters |
| 2014/0239064 A1 | 8/2014 | Onishi et al. |
| 2014/0239065 A1 | 8/2014 | Zhou et al. |
| 2014/0246492 A1 | 9/2014 | Hill et al. |
| 2014/0247927 A1 | 9/2014 | Bouzid et al. |
| 2014/0254896 A1 | 9/2014 | Zhou et al. |
| 2014/0258007 A1 | 9/2014 | Calman et al. |
| 2014/0263423 A1 | 9/2014 | Akdogan et al. |
| 2014/0263425 A1 | 9/2014 | Akdogan et al. |
| 2014/0263622 A1 | 9/2014 | Babatz et al. |
| 2014/0263627 A1 | 9/2014 | Wyatt |
| 2014/0267719 A1 | 9/2014 | Akdogan et al. |
| 2014/0270108 A1 | 9/2014 | Riahi et al. |
| 2014/0270112 A1 | 9/2014 | Moore et al. |
| 2014/0270113 A1 | 9/2014 | Moore et al. |
| 2014/0279094 A1 | 9/2014 | Neighman et al. |
| 2014/0279096 A1 | 9/2014 | Akin |
| 2014/0281206 A1 | 9/2014 | Crawford et al. |
| 2014/0282961 A1 | 9/2014 | Dorfman et al. |
| 2014/0286481 A1 | 9/2014 | Jaiswal et al. |
| 2014/0287715 A1 | 9/2014 | Hodge et al. |
| 2014/0289124 A1 | 9/2014 | Jackson et al. |
| 2014/0289323 A1 | 9/2014 | Kutaragi et al. |
| 2014/0297528 A1 | 10/2014 | Agrawal et al. |
| 2014/0298421 A1 | 10/2014 | Johnson |
| 2014/0304725 A1 | 10/2014 | Ritter et al. |
| 2014/0306004 A1 | 10/2014 | Park et al. |
| 2014/0308935 A1 | 10/2014 | Roundtree et al. |
| 2014/0313998 A1 | 10/2014 | Sorescu |
| 2014/0316919 A1 | 10/2014 | Li et al. |
| 2014/0317097 A1 | 10/2014 | Elias et al. |
| 2014/0319212 A1 | 10/2014 | Gannon |
| 2014/0319213 A1 | 10/2014 | Gannon |
| 2014/0324694 A1 | 10/2014 | Fernandes |
| 2014/0330655 A1 | 11/2014 | Aziz et al. |
| 2014/0330656 A1 | 11/2014 | Zhou et al. |
| 2014/0330659 A1 | 11/2014 | Yopp et al. |
| 2014/0332588 A1 | 11/2014 | Morley, Jr. |
| 2014/0342709 A1 | 11/2014 | Stepanian |
| 2014/0343943 A1 | 11/2014 | Al-Telmissani |
| 2014/0344081 A1 | 11/2014 | Soundararajan |
| 2014/0344082 A1 | 11/2014 | Soundararajan |
| 2014/0350932 A1 | 11/2014 | Grover |
| 2014/0359714 A1 | 12/2014 | Pluss et al. |
| 2014/0370852 A1 | 12/2014 | Wohlert et al. |
| 2014/0372222 A1 | 12/2014 | Wallaja |
| 2014/0376703 A1 | 12/2014 | Timem et al. |
| 2014/0379339 A1 | 12/2014 | Timem et al. |
| 2014/0379340 A1 | 12/2014 | Timem et al. |
| 2015/0001292 A1 | 1/2015 | Hamilton |
| 2015/0006304 A1 | 1/2015 | Carbonell et al. |
| 2015/0012372 A1 | 1/2015 | Veseli |
| 2015/0019220 A1 | 1/2015 | Talhami et al. |
| 2015/0019358 A1 | 1/2015 | Carlegren et al. |
| 2015/0019434 A1 | 1/2015 | Blair et al. |
| 2015/0023480 A1 | 1/2015 | Lagadec et al. |
| 2015/0193776 A1 | 1/2015 | Douglas et al. |
| 2015/0034716 A1 | 2/2015 | Rouchouze et al. |
| 2015/0039315 A1 | 2/2015 | Gross |
| 2015/0042451 A1 | 2/2015 | Matsumoto |
| 2015/0051992 A1 | 2/2015 | Smith |
| 2015/0053759 A1 | 2/2015 | Cahill et al. |
| 2015/0056915 A1 | 2/2015 | Brisebois et al. |
| 2015/0060541 A1 | 3/2015 | Lin |
| 2015/0067822 A1 | 3/2015 | Randall |
| 2015/0076224 A1 | 3/2015 | Cannon et al. |
| 2015/0077228 A1 | 3/2015 | Dua |
| 2015/0078538 A1 | 3/2015 | Jain |
| 2015/0081559 A1 | 3/2015 | Dua |
| 2015/0084738 A1 | 3/2015 | Menczel et al. |
| 2015/0088750 A1 | 3/2015 | Dua |
| 2015/0089568 A1 | 3/2015 | Sprague et al. |
| 2015/0206133 A1 | 3/2015 | Tang et al. |
| 2015/0090784 A1 | 4/2015 | Pataia |
| 2015/0094026 A1 | 4/2015 | Martin |
| 2015/0095028 A1 | 4/2015 | Karpey et al. |
| 2015/0095174 A1 | 4/2015 | Dua |
| 2015/0095235 A1 | 4/2015 | Dua |
| 2015/0097029 A1 | 4/2015 | Lin et al. |
| 2015/0100441 A1 | 4/2015 | Alarcon et al. |
| 2015/0100488 A1 | 4/2015 | Dua |
| 2015/0103991 A1 | 4/2015 | Albert et al. |
| 2015/0106214 A1 | 4/2015 | Suzuki |
| 2015/0109100 A1 | 4/2015 | Naidoo et al. |
| 2015/0112821 A1 | 4/2015 | Giacometti |
| 2015/0113622 A1 | 4/2015 | Dua |
| 2015/0113623 A1 | 4/2015 | Dua |
| 2015/0122883 A1 | 5/2015 | del Toro |

(56) References Cited

U.S. PATENT DOCUMENTS

| | | |
|---|---|---|
| 2015/0122888 A1 | 5/2015 | Kinoshita et al. |
| 2015/0127475 A1 | 5/2015 | Mushing |
| 2015/0127538 A1 | 5/2015 | Tew et al. |
| 2015/0131789 A1 | 5/2015 | Brown et al. |
| 2015/0140969 A1 | 5/2015 | Neal et al. |
| 2015/0143859 A1 | 5/2015 | Beck, Jr. |
| 2015/0240532 A1 | 5/2015 | Kao et al. |
| 2015/0320209 A1 | 5/2015 | Hasselback et al. |
| 2015/0152669 A1 | 6/2015 | Kindstrand et al. |
| 2015/0156328 A1 | 6/2015 | Arslan et al. |
| 2015/0159405 A1 | 6/2015 | Calkins |
| 2015/0163121 A1 | 6/2015 | Mahaffey et al. |
| 2015/0167353 A1 | 6/2015 | Winkler |
| 2015/0167360 A1 | 6/2015 | Chung |
| 2015/0169314 A1 | 6/2015 | Dicks et al. |
| 2015/0176306 A1 | 6/2015 | Lai |
| 2015/0184428 A1 | 7/2015 | Zalavari |
| 2015/0184429 A1 | 7/2015 | Juan |
| 2015/0186634 A1 | 7/2015 | Crandell et al. |
| 2015/0191939 A1 | 7/2015 | Rudduck et al. |
| 2015/0191950 A1 | 7/2015 | Bartley |
| 2015/0193752 A1 | 7/2015 | Simpson |
| 2015/0199502 A1 | 7/2015 | Chen et al. |
| 2015/0199668 A1 | 7/2015 | Fernando et al. |
| 2015/0204112 A1 | 7/2015 | Salzmann et al. |
| 2015/0204119 A1 | 7/2015 | Ermini |
| 2015/0205981 A1 | 7/2015 | Lee et al. |
| 2015/0208059 A1 | 7/2015 | Hassebrook et al. |
| 2015/0210248 A1 | 7/2015 | Sidorov |
| 2015/0211254 A1 | 7/2015 | Hesselback |
| 2015/0211263 A1 | 7/2015 | Bullwinkel |
| 2015/0211657 A1 | 7/2015 | Rohde |
| 2015/0213351 A1 | 7/2015 | Wyatt |
| 2015/0213371 A1 | 7/2015 | Nitz et al. |
| 2015/0215423 A1 | 7/2015 | Aaron |
| 2015/0218861 A1 | 8/2015 | Pancel |
| 2015/0233148 A1 | 8/2015 | Yu |
| 2015/0233149 A1 | 8/2015 | Carnevali |
| 2015/0249664 A1 | 9/2015 | Talhami et al. |
| 2015/0254621 A1 | 9/2015 | Matsumoto |
| 2015/0259951 A1 | 9/2015 | Nazzari |
| 2015/0262174 A1 | 9/2015 | Mongillo, III et al. |
| 2015/0267439 A1 | 9/2015 | Thoonsen |
| 2015/0269543 A1 | 9/2015 | Park et al. |
| 2015/0269945 A1 | 9/2015 | Taylor et al. |
| 2015/0271329 A1 | 9/2015 | Deshmukh et al. |
| 2015/0275550 A1 | 10/2015 | Burrus et al. |
| 2015/0278810 A1 | 10/2015 | Ramatchandirane et al. |
| 2015/0283465 A1 | 10/2015 | Aldercci |
| 2015/0287016 A1 | 10/2015 | Sagady et al. |
| 2015/0289601 A1 | 10/2015 | Crossland |
| 2015/0289602 A1 | 10/2015 | Crossland |
| 2015/0290553 A1 | 10/2015 | Stockinger et al. |
| 2015/0292238 A1 | 10/2015 | Bastianini |
| 2015/0292240 A1 | 10/2015 | Ribas et al. |
| 2015/0295709 A1 | 10/2015 | Montana |
| 2015/0297044 A1 | 10/2015 | McCarthy et al. |
| 2015/0299995 A1 | 10/2015 | Ye et al. |
| 2015/0299996 A1 | 10/2015 | Oberholzer et al. |
| 2015/0302374 A1 | 10/2015 | Sartor |
| 2015/0302391 A1 | 10/2015 | Lindfeldt et al. |
| 2015/0302413 A1 | 10/2015 | Dua |
| 2015/0305182 A1 | 10/2015 | Berry et al. |
| 2015/0308154 A1 | 10/2015 | Avganim |
| 2015/0308160 A1 | 10/2015 | Herdman |
| 2015/0310187 A1 | 10/2015 | Rabinowitz |
| 2015/0310412 A1 | 10/2015 | Calderon et al. |
| 2015/0310417 A1 | 10/2015 | Syed |
| 2015/0310469 A1 | 10/2015 | Bemmel et al. |
| 2015/0312404 A1 | 10/2015 | Abramson et al. |
| 2015/0314820 A1 | 11/2015 | Fournier |
| 2015/0315823 A1 | 11/2015 | Stevens |
| 2015/0317497 A1 | 11/2015 | Azuma |
| 2015/0317621 A1 | 11/2015 | Jin |
| 2015/0317623 A1 | 11/2015 | Beilis et al. |
| 2015/0322658 A1 | 11/2015 | Sikirov |
| 2015/0322693 A1 | 11/2015 | Levine |
| 2015/0324773 A1 | 11/2015 | Takeuchi et al. |
| 2015/0324785 A1 | 11/2015 | Lin et al. |
| 2015/0324803 A1 | 11/2015 | Karamchedu |
| 2015/0326629 A1 | 11/2015 | Conway et al. |
| 2015/0327728 A1 | 11/2015 | Aubain et al. |
| 2015/0328393 A1 | 11/2015 | Stephens et al. |
| 2015/0330102 A1 | 11/2015 | Chen |
| 2015/0330103 A1 | 11/2015 | Chen |
| 2015/0332250 A1 | 11/2015 | Culwell |
| 2015/0332531 A1 | 11/2015 | Davidsson et al. |
| 2015/0334112 A1 | 11/2015 | Novack et al. |
| 2015/0335214 A1 | 11/2015 | Wille |
| 2015/0337525 A1 | 11/2015 | Bailey |
| 2015/0337564 A1 | 11/2015 | Mubarak |
| 2015/0337565 A1 | 11/2015 | DiBella et al. |
| 2015/0339175 A1 | 11/2015 | Liang et al. |
| 2015/0339652 A1 | 11/2015 | Park et al. |
| 2015/0341344 A1 | 11/2015 | Dorfman et al. |
| 2015/0345122 A1 | 12/2015 | Talbot |
| 2015/0345163 A1 | 12/2015 | Cunerty |
| 2015/0345178 A1 | 12/2015 | Kushida et al. |
| 2015/0345179 A1 | 12/2015 | Kushida et al. |
| 2015/0345182 A1 | 12/2015 | Carlson |
| 2015/0345183 A1 | 12/2015 | Taylor et al. |
| 2015/0347994 A1 | 12/2015 | Nakamura |
| 2015/0348009 A1 | 12/2015 | Brown et al. |
| 2015/0350888 A1 | 12/2015 | Miranda |
| 2015/0351591 A1 | 12/2015 | Wechter |
| 2015/0354190 A1 | 12/2015 | Willers |
| 2015/0354192 A1 | 12/2015 | Hauth |
| 2015/0356547 A1 | 12/2015 | Abed |
| 2015/0356817 A1 | 12/2015 | Alderucci |
| 2015/0363756 A1 | 12/2015 | Zieger et al. |
| 2015/0363784 A1 | 12/2015 | Dragiff et al. |
| 2015/0368928 A1 | 12/2015 | Ulrich et al. |
| 2015/0368931 A1 | 12/2015 | Wolf |
| 2015/0368932 A1 | 12/2015 | Mahaffey et al. |
| 2015/0368935 A1 | 12/2015 | Sugita et al. |
| 2015/0371218 A1 | 12/2015 | Tang et al. |
| 2015/0376886 A1 | 12/2015 | Hanifl et al. |
| 2015/0379502 A1 | 12/2015 | Sharma et al. |
| 2015/0379797 A1 | 12/2015 | Lee et al. |
| 2015/0382137 A1 | 12/2015 | Prehn et al. |
| 2016/0000249 A1 | 1/2016 | Matthews et al. |
| 2016/0002957 A1 | 1/2016 | Trinh et al. |
| 2016/0005043 A1 | 1/2016 | Goldstone et al. |
| 2016/0007712 A1 | 1/2016 | Blaylock |
| 2016/0007808 A1 | 1/2016 | Hunt |
| 2016/0012652 A1 | 1/2016 | Biderman et al. |
| 2016/0017636 A1 | 1/2016 | Charnley et al. |
| 2016/0019380 A1 | 1/2016 | Miyasato et al. |
| 2016/0019507 A1 | 1/2016 | Takamura et al. |
| 2016/0019523 A1 | 1/2016 | Uzo |
| 2016/0023633 A1 | 1/2016 | Yoshida et al. |
| 2016/0023634 A1 | 1/2016 | Laval et al. |
| 2016/0026997 A1 | 1/2016 | Tsui et al. |
| 2016/0027284 A1 | 1/2016 | Kamp et al. |
| 2016/0034725 A1 | 2/2016 | Yasutomi et al. |
| 2016/0034860 A1 | 2/2016 | Sakamoto et al. |
| 2016/0034887 A1 | 2/2016 | Lee |
| 2016/0040453 A1 | 2/2016 | Matre |
| 2016/0040455 A1 | 2/2016 | Limbert et al. |
| 2016/0042342 A1 | 2/2016 | Proctor et al. |
| 2016/0042352 A1 | 2/2016 | Motoki et al. |
| 2016/0047146 A1 | 2/2016 | Yun |
| 2016/0048843 A9 | 2/2016 | Shintani et al. |
| 2016/0051146 A1 | 2/2016 | Eaton et al. |
| 2016/0052489 A1 | 2/2016 | Kiso et al. |
| 2016/0054080 A1 | 2/2016 | Haimi |
| 2016/0055472 A1 | 2/2016 | Oh et al. |
| 2016/0055473 A1 | 2/2016 | Lin et al. |
| 2016/0055476 A1 | 2/2016 | Culton |
| 2016/0055683 A1 | 2/2016 | Liu |
| 2017/0124312 A1* | 5/2017 | Inoue .................... G06F 21/32 |

\* cited by examiner

DEVICE AND METHOD FOR VALIDATING A USER USING AN INTELLIGENT VOICE PRINT

CROSS-REFERENCE TO RELATED APPLICATION

The present application claims the benefit of priority to U.S. Provisional Patent Application No. 62/298,041, filed Feb. 22, 2016, titled "PSYCHOLBABBLE", which is hereby incorporated by reference in its entirety.

FIELD

The present invention relates generally to validating a user and more particularly, to software applications directed to validating a user for access to a secure system.

BACKGROUND

Security is a revolving door. What may be secure today will not be secure tomorrow. With the ever-increasing skill and determination of today's hackers, personal data is more at risk than ever. Currently on the market there are various degrees of authentication methods that range from a simple login, to slightly more sophisticated means like 2-step verification methods used by Facebook and Google. This only solidifies the point that the more important the data, the more important the authentication. Banks use not only login, but try to use extra 2 or 3 step processes like picture verification, passphrase verification, and browser identification. These are very good methods; however, all can still be circumvented as there are a limited number of possible correct answers.

With the development of an essentially "un-hackable" solution, the world (and everyone's bank accounts) would be more secure than ever. Accordingly, there is a need for a secure login process that overcomes the shortcomings stated above.

SUMMARY

The present invention aims to address the above by providing an iron clad login process that removes the need for written passwords by utilizing an infinite (picture) to infinite (voice) method of authentication.

An exemplary embodiment of a method of validating a user for accessing a secure system comprises selecting a picture that is prompted to the user, generating, through the user, an intelligent voice print in regards to the selected picture, matching the intelligent voice print associated with the selected picture to a stored authentication voice print and picture pair, authenticating the user when the intelligent voice print is matched to within a predetermined voice tolerance, verifying a textual component of the intelligent voice print to within a predetermined textual tolerance, validating the authenticating and the verifying of the user, and receiving access to the secure system based on the validating of the user against the stored intelligent voice print and picture pair.

In related versions, the method further comprises entering a username and a password.

In related versions, the method further comprises generating at least one device identifier based on a device component of a device used to access the secure system.

In related versions, access is received based on a matching of the at least one device identifier to a previously stored device identifier.

In related versions, the method further comprises generating a location identifier based on a predesignated location of the user.

In related versions, access is received based on a matching of the location identifier to a previously stored location identifier.

In related versions, the method further comprises generating identification voice prints in response to stored user identification questions, and receiving access to the secure system based on biometric authentication of the identification voice prints.

An exemplary embodiment of a method of validating a user comprises prompting a user to select and describe an image, receiving a picture selection by the user, receiving an intelligent voice print from the user based on the picture selection, verifying a textual component of the intelligent voice print, authenticating the intelligent voice print, validating the user based on the verifying and authenticating, and granting access to the user based on the validating of the user.

In related versions, the method further comprises receiving a username and a password, and validating the username and the password.

In related versions, the intelligent voice print matches a previous picture and intelligent voice print pair selection that was selected and stored by the user.

In related versions, validating the textual component comprises converting the intelligent voice print to a text file and comparing the text file to a previously stored text file.

In related versions, the textual component is verified if the comparing is within a set predetermined tolerance.

In related versions, authenticating the intelligent voice print comprises comparing the intelligent voice print with a previously stored intelligent voice print.

In related versions, the intelligent voice print is authenticated if the comparing is within a set predetermined tolerance.

In related versions, the method further comprises generating a picture presentation.

An exemplary embodiment of an electronic device for executing a software application for validating a user for accessing a secure system comprises an input for receiving a picture selection by the user, a voice input for receiving from the user an intelligent voice print based on the picture selection, a verification component for encrypted communication with a verification server for verifying a textual component of the intelligent voice print, an authentication component for encrypted communication with an authentication server for authenticating the intelligent voice print, and a validation component for encrypted communication with a validation server for validating the user based on the authenticating and verifying of the user.

In related versions, the electronic device further comprises at least one device component identifier for use in authenticating the electronic device.

In related versions, the electronic device further comprises a location transmitter for encrypted transmission of a location of the user for use in validating a predesignated location of the user.

In related versions, the intelligent voice print is within a set predetermined time threshold.

In related versions, the electronic device is a desktop computer, a mobile device, a website, a server farm, a server, a virtual machine, a cloud server, and/or a cloud virtual machine, and the software application is a plug-in application to other software or hardware.

The contents of this summary section are provided only as a simplified introduction to the invention, and are not intended to be used to limit the scope of the appended claims. The present disclosure has been described above in terms of presently preferred embodiments so that an understanding of the present disclosure can be conveyed. However, there are other embodiments not specifically described herein for which the present disclosure is applicable. Therefore, the present disclosure should not be seen as limited to the forms shown, which should be considered illustrative rather than restrictive.

DRAWINGS

Other systems, methods, features and advantages of the present invention will be or will become apparent to one of ordinary skill in the art upon examination of the following figures and detailed descriptions. It is intended that all such additional apparatuses, systems, methods, features and advantages be included within this description, be within the scope of the present invention, and be protected by the appended claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used herein, a "voice print" is defined as an intelligent verbal response by a user to a stimulus. The intelligent verbal response comprises a biometric component as well as a textual component. The biometric component is for authenticating the user by the sound of his/her voice. The textual component is for verifying the speech content of the verbal response. As used herein, "voice print" and "intelligent voice print" are used interchangeably.

Figure 1:
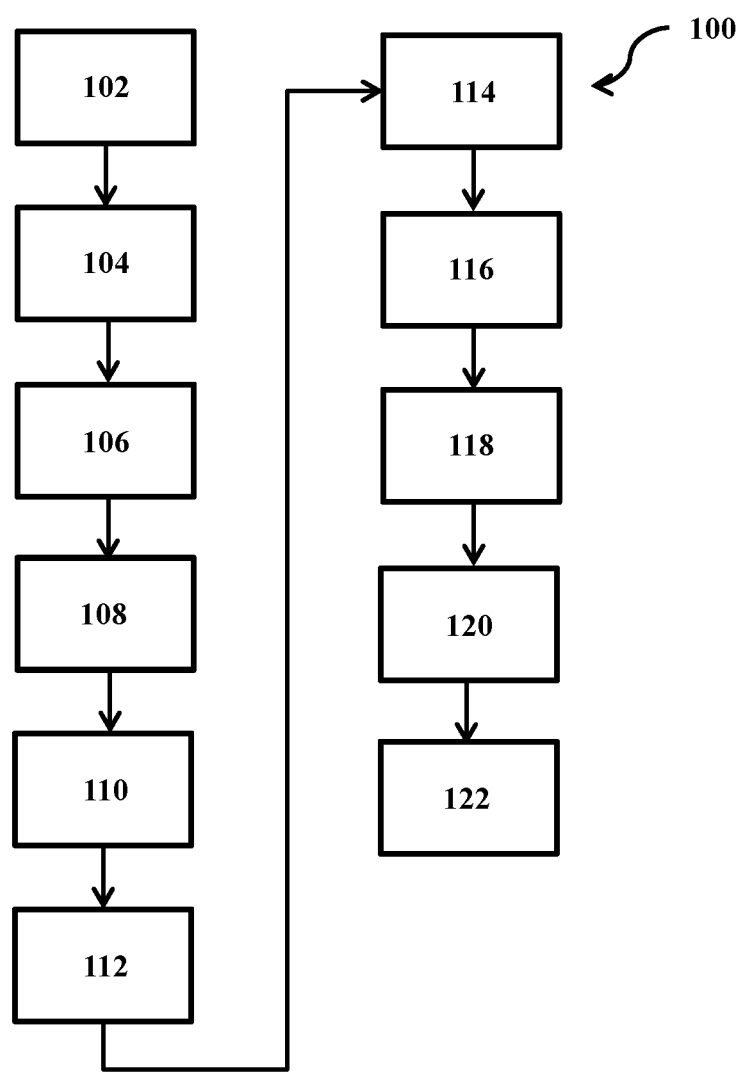
FIG. 1 is a flowchart depicting an exemplary embodiment of a method for setting up a secure login.

Referring to FIG. 1, aspects of a method 100 that can be implemented as a software application for setting up and creating a secure login are illustrated. The method 100 may include, for example, at 102, a user creating a username and password. In certain versions, the username can be an email of the user. In related versions, the user will be prompted to repeat the password in order to verify correct spelling of the password.

After successfully entering the username and password, at 104, the user will be directed to a management page that will allow them to upload pictures that they can generate a voice print (i.e., an intelligent voice print) against. In certain versions, a maximum of three pictures can be uploaded. Alternatively, a variety of picture upload limits can be utilized.

Before the secure login can be created, at 106 the user must create a valid voice print associated to each uploaded picture. The voice print for each picture can be created by using: 1) an uploading picture browse button, 2) a delete button, 3) a create voice print button, and 4) a validate voice print button (for use after the voice print is created). These buttons can be implemented on a graphical user interface (GUI) as known in the art.

At 108, once the create voice print button is pushed, a message box will appear with the words "Press [record] and say what you see in your special picture." Various alternatives to this message can also be used that convey the same meaning to the user. The user is required to have at least one picture and voice print recording pair.

At 110, the user will be required to read a phrase that will be recorded and used to generate a footprint key for use later in voice authentication. For example, the footprint key can be generated by conventional means, such as, but not limited to, training a biometric authentication system provided by Kivox.

In related versions, the phrase can be a poem, song, or any other stimulus that will generate a verbal response from the user. In related versions, the phrase can be of various lengths, including, but not limited to, 5 seconds, 10 seconds, 15 seconds, 30 seconds, or 45 seconds. The recording of the phrase can be automatically stopped once the desired length of time has elapsed.

At 112, the recorded phrase is sent to an authentication server, such as, but not limited to, Kivox (which can be hosted on the same server as the software application), to train a passive voice detection service on the authentication server. In related versions, prior to submitting the passive training file, the user can verify the recording to make sure it was a good recording.

In related versions, the user can delete any created picture-voice print combination, but must at least have one valid picture and voice print pair to continue.

In an alternative aspect, a user that is blind can be prompted to listen to a song, jingle, poem, phrase, or other audio signal. The blind user can then be prompted to sing, hum, whistle, or otherwise repeat the audio signal. The blind user's response can be recorded and used for authentication as described herein in accordance with the scope of the invention.

At 114, an additional layer of protection can be selected by the user in the form of a device-specific lockdown option. When the user has enabled this feature, at 116, upon user registration, the application (either thick native app or desktop app) will pull available unique device IDs and store these to restrict access to just those devices.

In the case of mobile devices (e.g., iPhones, Android smart phones, iPads, tablet computers, etc.), it is likely that just a single Device UUID will be accessible to authenticate the device with.

In the case of desktop software, available IDs will likely be Processor ID, Memory ID, Motherboard ID, and Network Card, MAC address.

When a user is setting up their account, they will be able to "Create Allowed Device" in their account. This will allow them to login and be authenticated with a device they have listed. Users can also "Remove An Allowed Device" from their list of devices.

It is understood that Unique Device ID restriction is not a foolproof method of security, as often these kinds of IDs can be spoofed. However, this is an additional layer of security that makes it that much less likely that a hacker will be able to combine their efforts to penetrate all the layers of security.

To validate the device ID information, the system will simply do a text comparison of the device ID information that is stored in the user profile with the information provided at login time by the device. In related versions, algorithmic permutations can be performed based upon the data that the devices give to the system in order to add another layer of security.

At 118, the user is given a location-specific lockdown option to add an additional layer of security based on a location of the user.

When this feature is activated, at 120, the system will obtain the GPS or WIFI location from the device (using built-in location services provided by the operating system according to methods well-known in the art) to obtain the geographic location of the device that the user is using to access the system.

Upon user setup, the user will be able to add locations they are allowed to access the system from by adding to their "Allowed Locations" list. They can also remove locations from this list.

In the case that the user is using a PC that is unable to accurately pinpoint its location (i.e., such as is the case sometimes with PCs that are running on WIFI access points that do not exist in the database of WIFI access point locations), the user may request that the system sends them a URL via text to their mobile device. The system will then send this text URL, which the user will open, and then the system will verify the user's location via their mobile web browser. This option can be done during the user account setup operation if the security configuration for that particular client allow for it (to allow for a customer's flexibility).

In related versions, the phone number where the text URLs are to be sent can be entered by the user at the time of user setup, but not during the login process. This is to enhance security in the system.

In related versions, via an administrative backend, the user can create an override for a user for a specific time period, so that they are allowed to bypass the location lockdown during that time period. This ability will be restricted to administrators for the user's account, and tied to a specific accessing user. This way, when the user is travelling, or otherwise out-of-town, they can still access the system.

At 122, registration is complete and the user is allowed into the system.

Figure 2:
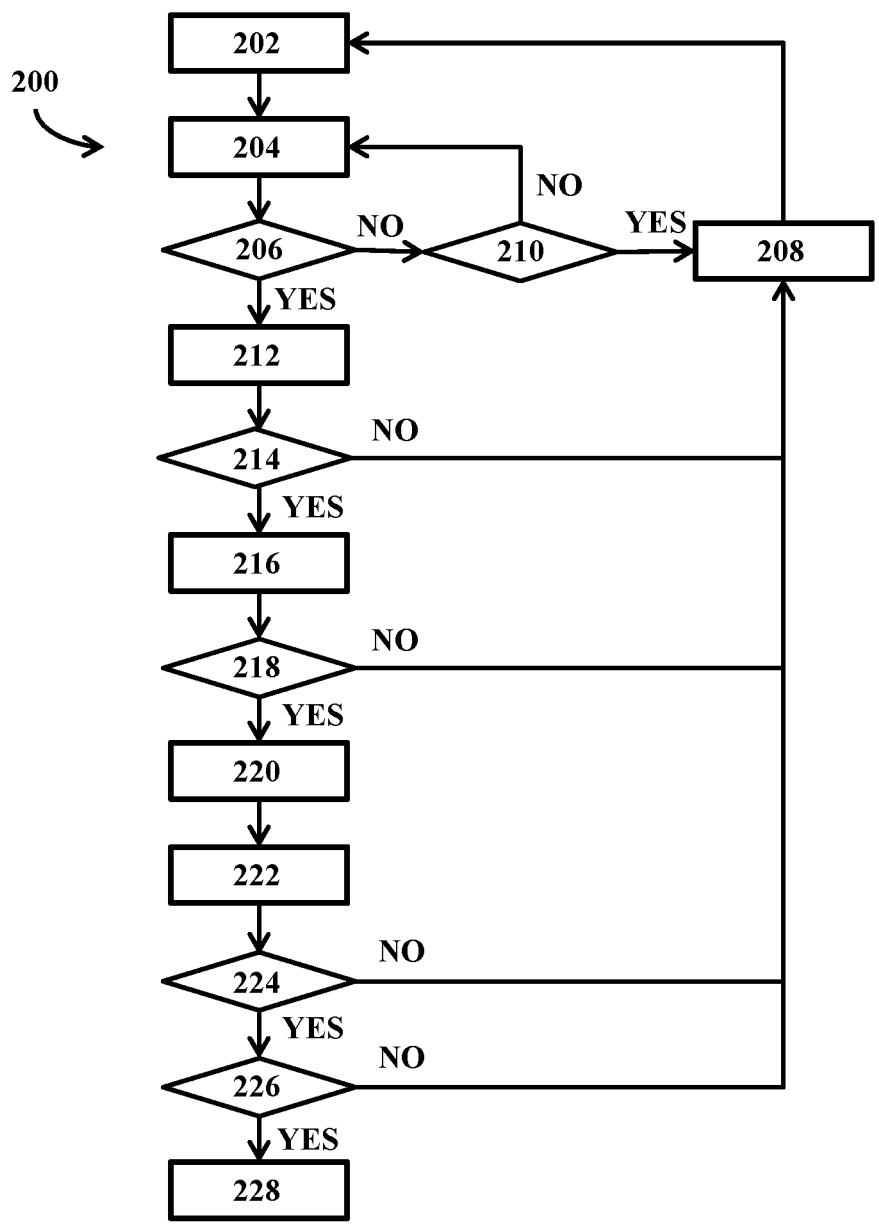
FIG. 2 is a flowchart depicting an exemplary embodiment of a method for accessing a secure system using the secure login.

Referring to FIG. 2, aspects of a method 200 that can be implemented as a software application for validating a user for accessing a secure system are illustrated. The method 200 may include, for example, at 202, accessing the software program. The software program can be executed on a variety of platforms, including, but not limited to, a desktop computer, a mobile device, a website, a server farm, a server, a virtual machine, a cloud server, and/or a cloud virtual machine. In related versions, the software application can be a plug-in application to other software or hardware as well-known in the art.

At 204, the user is presented with a login screen comprising a link to the registration page where they will enter their username and password.

If the user fails to enter proper authentication at 206, they will be locked out of the system for a specified number of minutes at 210. In related versions, the user is given a predetermined number of attempts before the use is locked out for the specified number of minutes at 208, after which the user must start over at 202. The specified number of minutes for lockout and the predetermined number of attempts are variable, and can be set by a system administrator as the administrator sees fit.

In versions where a device restriction is in place, after the user has entered their login, the system will gather unique device ID information at 212, and check to make sure that the device they are accessing the system from is in a list of Allowed Devices at 214. If it is not, the user will be directed back to 208, where the user will be shown an error message and locked out of the system for a specified number of minutes.

In related versions, the system will validate unique devices by pulling available hardware IDs such as, including, but not limited to, device ID, processor ID, motherboard ID, and other available IDs.

Once they have passed the Device Restriction (if enabled), the system will check the Location Restriction (if enabled for this customer). At 216, the location of the device or PC the user is accessing the system through will be collected. At 218, if the location matches an Allowed Location in that corresponds to the user, they will be allowed onto the next step. In related versions, the Allowed Location can be listed on a user list.

In related versions, if the user's PC is unable to provide location information, the user can select to authenticate their location via their mobile device. This will cause a URL to be texted to the user's mobile device (i.e., a number they have entered into their setup already), which can then access the user's location from their mobile browser (i.e., the user must give permission for the web app to access this information in order for the authentication to succeed).

In related versions, if the user in question has an active Location Override in effect, they will bypass this Location Restriction entirely for the specified time period. The Location Override can be determined by the user ahead of time. For example, if the user knows that he/she will be travelling and will be attempting to login while away, the user can set the Location Override prior to travelling.

If the user fails to authenticate their location by the methods above, they will be shown an error message and locked out of the system for a specified number of minutes at 208.

Once successful, the user will be presented with a series of questions that require verbal responses from the user. In related versions, the verbal responses will have to add up to be a minimum total length of audio. For example, the verbal responses can total seven seconds of audio, or any other predetermined length of time that is determined by the system administrator. The minimum total length of audio is needed for the purposes of biometric authentication of the user's voice.

Examples of questions can include, but is not limited to, "What is your name?", "What city were you born in?", "What is your mother's maiden name?", etc., and other similar questions. In related versions the questions can be worded in any way that convey the same meaning. In related versions, the questions are directed toward personal information related to the user that only the user would know.

At 220, the user is shown a picture presentation. The picture presentation can be implemented in a variety of ways. For example, in some versions, the user is shown a picture with several other randomly chosen pictures of same size. The pictures can sourced from a customized database of stock photos, or can be sourced online from databases of images in the public domain. In another version, the picture presentation can be a series of randomized pictures that are presented to the user one at a time, where the user is asked to identify each picture as familiar or unfamiliar.

At 222, the user is prompted to give a verbal response to a picture they recognize to create an intelligent voice print. In related versions, the intelligent voice print can be a predetermined length, such as a seven second wave file generated from the captured voice response. The predetermined length can be of any length sufficient for the purposes of biometric voice identification and verification of the user.

In related versions, if the intelligent voice print is not at least a predetermined length, the user will be required to repeat a canned phrase to make up the difference.

At 224, the intelligent voice print is sent off to verify the user against a voice print that was generated prior during creation of the secure login. For example, a biometric component of the intelligent voice print is matched against a biometric component of the prior generated voice print to determine if it is the same person that is talking. If this returns as a failure, the user is denied access and is sent to an access denied page/lockout page at 208.

If the voice is authenticated, then the textual content of the intelligent voice print is verified next at 226. In related versions, a third party text recognition tool as well-known in the art (e.g., Annyang!) can be used to validate that not only were they the person who said it, but the text they said matched. This adds a second layer of security that will be hard to bypass because not only does it have to be the same voice, but also the same textual content.

In related versions, the textual content can be a textual component of the intelligent voice print, and is compared against a prior saved text that was generated prior during creation of the secure login. In some versions, the textual component must match the prior saved text to within a specified tolerance that is determined by an administrator (e.g., 75%-95% accurate, or any other value) in order to be verified. In some versions the textual component must match exactly to the prior saved text.

If there is a successful text match, then at 228 the user is allowed to login and given access to sensitive data, such as, but not limited to, bank account information, etc.

If there is an unsuccessful text match, then at 208 the user is denied access and sent them to an access denied page. In related versions, in the event of an unsuccessful text match and/or unsuccessful biometric authentication of the user, the intelligent voice print is kept on file as evidence of a potential hacker and/or identity thief for the future purposes of potential criminal investigations and/or related proceedings. In these cases, the intelligent voice print is an essential sample of what the accused hacker and/or identity thief sounds like, which can be very useful as evidence moving forward to catch criminals.

In alternative versions, for the case of a blind user, the above steps can be repeated and in lieu of a visual cue, such as a picture, a sound verification can be used. The sound verification could be a song, jingle, or other audio cue as disclosed herein, and authentication of the blind user would proceed similarly to what is described herein.

In related versions, the method can be implemented in a software application, such as a mobile application, or the like, and can be a plug-in application for use on other software or hardware. For example, a web-based plug-in application, similar to the way in which reCAPTCHA (https://www.google.com/recaptcha/intro/index.html) works, the application can be designed to be "callable" or usable on any other webpage as a login layer. The way this could work is that a "Plugin Signup Website" can be created, where a person who wants to lock down their site using the secure login enters their information, and their website's information, and receives a block of HTML and javascript to paste on their page (similar to: https://www.google.com/recaptcha/admin#list). This javascript will make the application's control functions appear as a component box, and then users can implement a call on their site to the application's servers that gets called after submission to determine if the user passed or failed the application's authentication.

Accordingly, the application can be monetized by charging site owners a fee to implement this control (by restricting which sites submissions are accepted from, or more likely, requiring a private API key to be sent with the request), and charge them accordingly. It could be marketed as a simple and easy way to add the level of voice/phrase authentication being provided to any website that wants to implement it.

In related versions, the application can be implemented as a desktop plug-in. For example, in a similar way to the web-based control version described herein and above, a desktop plug-in implementing the application can be developed for use by desktop tools for logging into the software. As long as there is an Internet connection, the application will be able to communicate through the desktop whether or not the authentication passed or failed. An SAAS model for payment and processing of the authentication requests can be utilized, so it would be compatible with the web-based control option described herein.

In related versions, a mobile plug-in version for iOS and Android developers can also be implemented that can be dropped into any application. Using this approach, application developers can be charged a 15 monthly recurring fee to use the secure login service, which would add strong security to their application.

In related versions, additional data encryption can add further levels of security to the database that stores data relating to intelligent voice prints, passwords, etc.

In related versions, image sourcing of placebo images (i.e., images that are used as random images for the purposes of a picture presentation) can be sourced from public databases on the Internet of public domain images. This is advantageous over using stored stock images because the images would never be the same twice. Alternatively, an algorithm can be implemented to prevent a hacker from being able to tell which image was the "secret" image by seeing which one was repeated the most often. Such an algorithm could use code octets pursuant to the Pythagorean Theorem. For example, the code octets could be used in a unique combination to calculated C squared in a Pythagorean theorem, where that solution number would be encrypted and placed inside the desktop or device for a later security check upon user authentication and decryption. Additionally, "code signing" and "time stamping" can be utilized to protect the code and alert the company of software changes by malicious code which will filter to an alert.

Third party resources that can be used to implement various aspects of the methods described herein can include Agnitio KIVOX (http://www.agnitio-corp.com/) for biometric voice authentication, CMU Sphinx for text recognition (http://cmusphinx.sourceforge.net/), Annyang! for speech recognition software (https://www.talater.com/annyang/), and RecorderJs for microphone in a browser (https://github.com/mattdiamond/Recorderjs). It is understood that these disclosed third party resources are listed by examples only, and are not meant to be exclusive. Other similar third party resources for similar functions can also be implemented without departure from the spirit of the disclosure herein.

As can be seen from the description herein, the combining of a unique verbal phrase to a picture match achieves a psychological security lock that is virtually impossible to hack.

Figure 3:
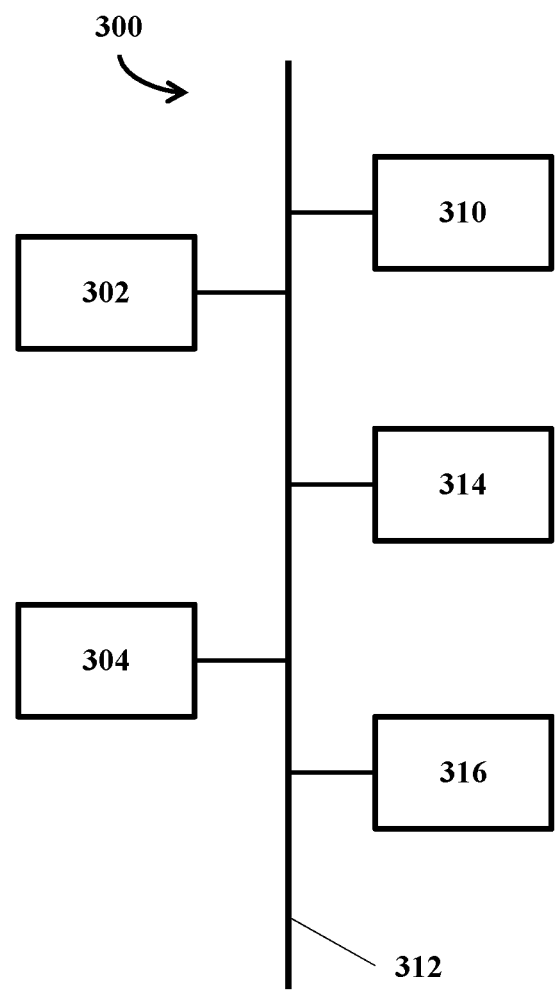
FIG. 3 is a block diagram depicting an exemplary electronic device for accessing a secure system using the secure login.

FIG. 3 is a conceptual block diagram illustrating components of an apparatus or system 300 for accessing a secure system using a secure login. The apparatus or system 300 may include additional or more detailed components as described herein. As depicted, the apparatus or system 300 may include functional blocks that can represent functions implemented by a processor, software, or combination thereof (e.g., firmware).

As illustrated in FIG. 3, the apparatus or system 300 may comprise at least one input 302 for receiving input from a user. The component 302 may be, or may include, a means for receiving input from the user. Said means may include the processor 310 coupled to the memory 316, and to the network interface 314, or other hardware, the processor executing an algorithm based on program instructions stored in the memory. Such algorithm may include a sequence of more detailed operations, for example, receiving a picture selection and a voice input from the user as described above in relation to FIGS. 1 and 2. In some versions, the electrical component 302 can be a microphone, keyboard, mouse, camera, or other input component known in the art.

The apparatus 300 may optionally include a processor module 310 having at least one processor. The processor 310, may be in operative communication with the other components via a bus 312 or similar communication coupling. The processor 310 may effect initiation and execution of the processes or functions performed by the electrical components as described above in relation to FIGS. 1 and 2.

In related aspects, the apparatus 300 may include a network interface module 304 operable for communicating with a verification server, an authentication server, and/or a validation server over a computer network. The network interface module 304 can comprise a verification component, an authentication component, and a validation component. In further related aspects, the apparatus 300 may optionally include a module for storing information, such as, for example, a memory device/module 316. The computer readable medium or the memory module 316 may be operatively coupled to the other components of the apparatus 300 via the bus 312 or the like. The memory module 316 may be adapted to store computer readable instructions and data for effecting the processes and behavior of the modules, and subcomponents thereof, or the processor 310, or the methods 100 or 200 and one or more of the additional operations as disclosed herein. The memory module 316 may retain instructions for executing functions associated with the modules. While shown as being external to the memory 316, it is to be understood that the modules can exist within the memory 316.

In view of the exemplary systems described herein, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers, or as a plug-in application to other software or hardware as well-known in the art.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects have been presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. Certain aspects disclosed herein may be performed using computing devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with certain aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications, combinations, and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted.

What is claimed is:

1. A method of validating a specific user for accessing a secure system comprising:
   receiving, into a device, a picture that is prompted to the user from among a plurality of pictures, as a selected picture;
   receiving an intelligent voice print in response to the selected picture, where text of the intelligent voice print represents a unique verbal response by the user to the selected picture defined by a relationship between the picture and the unique verbal response by the user;
   matching the intelligent voice print associated with the selected picture to a stored authentication voice print and picture pair, where the intelligent voice print and picture pair includes both a biometric voice print along with textual information from the unique verbal response;
   authenticating the user as being the specific user when the intelligent voice print is biometrically matched to within a predetermined voice tolerance to the authentication voice print;
   verifying a textual component of the intelligent voice print to within a predetermined textual tolerance to the unique verbal response to the selected picture;
   validating the authenticating and the verifying of the specific user; and
   receiving access to the secure system based on the validating of the user as being the specific user by comparing against the stored intelligent voice print and picture pair.

2. The method of claim 1 wherein the selecting comprises providing a picture presentation to the user, including a series of randomized pictures, and one picture which is recognized by the user, and where the selected picture is the one picture which is recognized by the user, and where the selection comprises another means of verification of identification of the user.

3. The method of claim 1 wherein the matching comprises verifying the order and/or combination of text, and the relationship between the picture and the unique verbal response by the user which comprises a picture and textual relationship used to access the secure system.

4. The method of claim 1, further comprising generating at least one device identifier based on a device component of a device used to access the secure system, wherein access is received based on a matching of the at least one device identifier to a previously stored device identifier.

5. The method of claim 1 further comprising generating a location identifier based on a predesignated location of the user and access is received based on a matching of the location identifier to a previously stored location identifier.

6. The method of claim 1 wherein the matching comprises determining a word and/or multiple words in any order for textual tolerance.

7. The method of claim 1 further comprising:
   generating identification voice prints in response to stored user identification questions; and
   receiving access to the secure system based on biometric authentication of the identification voice prints.

8. A method of validating a user comprising:
   prompting a user to select a picture from among a plurality of pictures, as a selected picture and to describe the picture;
   receiving a picture selection by the user;
   receiving an intelligent voice print from the user based on the picture selection, where text of the intelligent voice print represents a unique verbal response by the user to the selected picture defined by a relationship between the picture and the unique verbal response by the user;
   verifying a textual component of the intelligent voice print relative to textual information from the unique verbal response;

authenticating the intelligent voice print using biometric information gathered from the user;

validating the user based on the verifying and authenticating; and granting access to the user based on the validating of the user.

9. The method of claim 8 wherein the prompting further comprises providing a picture presentation to the user, including a series of randomized pictures, and one picture which is recognized by the user, and where the selected picture is the one picture which is recognized by the user, and where the selection comprises another means of verification of identification of the user.

10. The method of claim 8 wherein the intelligent voice print matches a previous picture and intelligent voice print pair selection that was selected and stored by the user.

11. The method of claim 8 wherein validating the textual component comprises converting the intelligent voice print to a text file and comparing the text file to a previously stored text file by verifying the order and/or combination of text, and the relationship between the picture and the unique verbal response by the user includes a combined relationship resulting in text.

12. The method of claim 11 wherein the textual component is verified if the comparing is within a preset but configurable predetermined tolerance.

13. The method of claim 8 wherein authenticating the intelligent voice print comprises comparing the intelligent voice print with a previously stored intelligent voice print.

14. The method of claim 13 wherein the intelligent voice print is authenticated if the comparing is within a preset but configurable predetermined tolerance.

15. The method of claim 8 further comprising generating a picture presentation comprises providing the picture presentation to the user, including a series of randomized pictures, and one picture which is recognized by the user.

16. An electronic device for executing a software application for validating a user for accessing a secure system, the electronic device comprising:

an input for receiving a picture selection by the user from among a plurality of pictures, as a selected picture;

a voice input for receiving from the user an intelligent voice print based on the picture selection, where text of the intelligent voice print represents a unique verbal response by the user to the selected picture defined by a relationship between the picture and the unique verbal response by the user;

a verification component for encrypted communication with a verification server for verifying a textual component of the intelligent voice print;

an authentication component for encrypted communication with an authentication server for authenticating the intelligent voice print, where the intelligent voice print and picture pair includes both a biometric voice print and also textual information from the unique verbal response; and a validation component for encrypted communication with a validation server for validating the user based on both, the intelligent voice print being biometrically matched to within a predetermined voice tolerance to the authentication voice print, and also based on verifying a textual component of the intelligent voice print to within a preset but configurable textual tolerance to the unique verbal response to the selected picture.

17. The electronic device of claim 16 wherein the input comprises a selected picture from among a picture presentation to the user, including a series of randomized pictures, and one picture which is recognized by the user, and where the selected picture is the one picture which is recognized by the user, and where the selection comprises another means of verification of identification of the user.

18. The electronic device of claim 16 wherein the electronic device comprises a location transmitter for encrypted transmission of a location of the user for use in validating a predesignated location of the user, and further comprising a device that generates at least one device identifier based on a device component of a device used to access the secure system.

19. The electronic device of claim 16 wherein the intelligent voice print is within a preset but configurable time threshold.

20. The electronic device of claim 16 wherein the electronic device is a desktop computer, a mobile device, a website, a server farm, a server, a virtual machine, a cloud server, and/or a cloud virtual machine, and the software application is a plug-in application to other software or hardware.

* * * * *

UNITED STATES PATENT AND TRADEMARK OFFICE
CERTIFICATE OF CORRECTION

PATENT NO. : 10,044,710 B2
APPLICATION NO. : 15/075516
DATED : August 7, 2018
INVENTOR(S) : Kurt Ransom Yap Page 1 of 1

It is certified that error appears in the above-identified patent and that said Letters Patent is hereby corrected as shown below:

On the Title Page

(73) Assignee should read: BPIP LIMITED LIABILITY COMPANY, BUFFALO, WY (US)

Signed and Sealed this
Sixth Day of November, 2018

Andrei Iancu
*Director of the United States Patent and Trademark Office*